United States Patent [19]

Urai et al.

[11] Patent Number: 4,993,679
[45] Date of Patent: Feb. 19, 1991

[54] LOCKING DEVICE FOR SLIDE RAIL IN VEHICLE SEAT

[75] Inventors: Muneharu Urai; Shigeru Kanai, both of Akishima, Japan

[73] Assignee: Tachi-S Co., Ltd., Tokyo, Japan

[21] Appl. No.: 340,632

[22] Filed: Apr. 20, 1989

[51] Int. Cl.⁵ ............................................. F16M 13/00
[52] U.S. Cl. .................................... 248/429; 248/393; 297/346
[58] Field of Search ........ 248/429, 430, 420, 393–397; 297/346

[56] References Cited

U.S. PATENT DOCUMENTS

| | | | |
|---|---|---|---|
| 2,271,913 | 2/1942 | Crabb | 248/430 |
| 3,631,740 | 1/1972 | Gavagan | 248/430 X |
| 4,291,856 | 9/1981 | Urai | |
| 4,301,988 | 11/1981 | Parizet | 248/430 |
| 4,478,383 | 10/1984 | Urai | 248/430 X |
| 4,828,214 | 5/1989 | Kanai et al. | 248/430 |

FOREIGN PATENT DOCUMENTS

| | | | |
|---|---|---|---|
| 2713973 | 10/1978 | Fed. Rep. of Germany | 248/429 |
| 58-55011 | 12/1983 | Japan . | |
| 61-295144 | 12/1986 | Japan . | |

Primary Examiner—Alvin C. Chin-Shue
Attorney, Agent, or Firm—Browdy and Neimark

[57] ABSTRACT

A locking device for a slide rail in a vehicle seat, and particularly for a pair of slide rails which each have an upper rail and a lower rail, said upper rail being formed by two half rail members. The locking device in the present invention includes a pair of stoppers which are slidably provided within the two half rail members respectively of the two upper rails such as to be vertically movable therein, a plurality of holes formed in the lower rails, into which holes the stopper is to be engaged, and a lever rod which is operatively connected with the stopper. Single operation of the lever rod causes engagement and disengagement of the stoppers into and from the holes for locking and unlocking of the slide rails at one time.

9 Claims, 3 Drawing Sheets 4,993,679

LOCKING DEVICE FOR SLIDE RAIL IN VEHICLE SEAT

BACKGROUND OF THE INVENTION

1. Field of the Invention

The present invention relates to a locking device for locking and unlocking the slider rails which is adapted to adjust the fore-and-aft postions of a vehicle seat, and in particular relates to a dual-type one in which a pair of locking devices are respectively provided upon the right and left slide rails.

2. Description of the Prior Arts

By way of example, a typical prior-art and improved locking devices for slide rails are known from the Japanese Patent Publication No. 58-55011, in which an improvement is made as against an external-type locking device which is most commonly used one provided externally of the slide rail, by integrally incorporating the slide rail in the seat frame and arranging a stopper above a lower rail of the slide rail such as to be engagable with the lower rail for locking purpose, whereby the locking device is internally provided in the seat frame and a part of slide rail. This first prior art is made by the inventors of the present invention, and afterwards, they produce a second improved locking device which is know from the Japanese Laid-Open Patent Publication No. 61-295144 wherein the upper rail of the slide rail is comprised of right-half and left-half members, with a stopper being slidably provided within a swollen portion defined between those two half members of the upper rail. According to the second pior art, the stopper is not exposed externally between the two half members of the upper rail.

However, while the inventors witness the success of the above-mentioned second prior art in terms of its slimplified, low-cost structure of the locking device, which is materialized by direct use of the upper rail, and therefore does not require additional members, realizing a weight-light structure, they have found that the related locking device has not yet been improved in simplicity of structure and has remained complicated structurally. When it comes to applying it to the dual-type locking device, the interlocking systems or the associated mechanisms result in being more complicated.

SUMMARY OF THE INVENTION

In view of the abovementioned drawbacks, it is a purpose of the present invention to provide an improved locking device for a slide rail in a vehicle seat which is simplified in structure.

In accomplishment of such purpose, the present invention comprises a pair of slide rails each having an upper rail and lower rail, a stopper which is slidably provided within each of the two upper rails such as to be vertically movable therein, a plurality of holes formed in each of the two lower rails, into which the stopper is to he engaged, and a generally U-shaped lever rod whose both ends are operatively connected with the two stoppers, respectively.

Accordingly, the mechanical elements required as a locking device are substantially limited to one lever rod, two stoppers and a plurality of holes, and as such the structure of locking device is greatly simplified. Further, one operation of the lever rod causes engagement and disengagement of the two stoppers at left and right upper rails into and from the holes at the corresponding lower rails, at one time, so that the locking operation is effected more positively.

In one aspect of the invention, the lever rod may be fromed in a recltilinear shape, with an operation lever equipped therewith, depending upon the design of a seat to be applied.

DETAILED DESCRIPTION OF PREFERRED EMBODIMENTS OF THE INVENTION

Referring to FIGS. 1(A) through 3, illustrated is a first embodiment of the present invention.

Designations (1) and (2), respectively, refer to a lower rail and an upper rail, both forming a slide rail (A).

Figure 2:
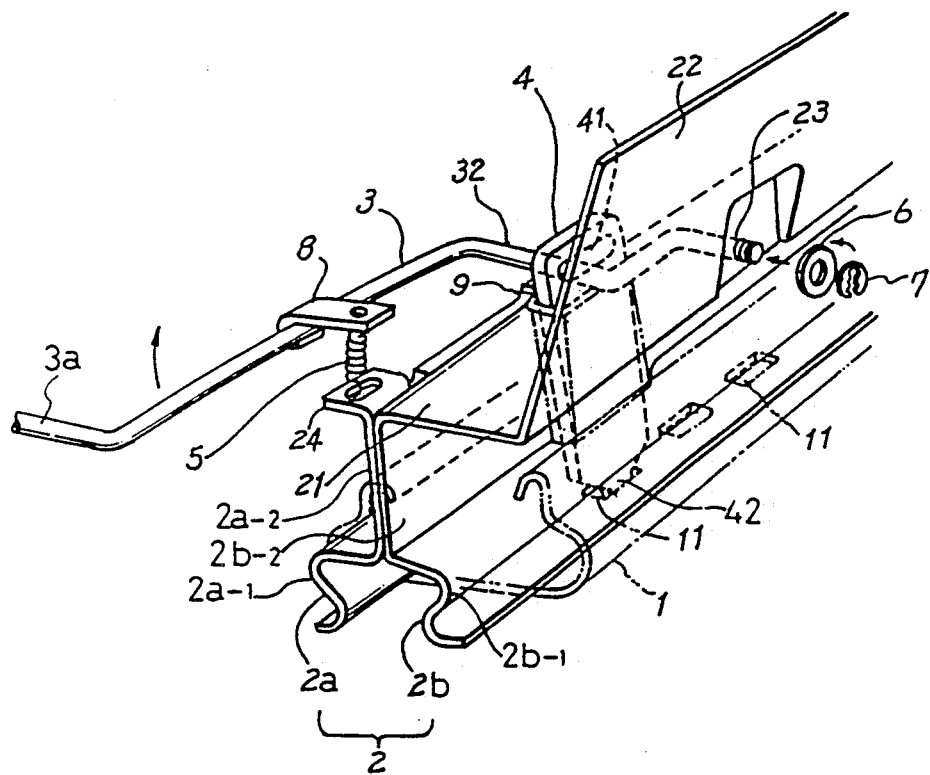
FIG. 2 is a partially enlarged perspective view of the principal part of the locking device.
Figure 3:
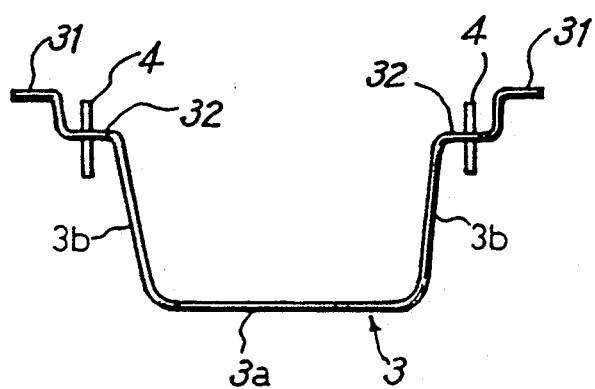
FIG. 3 is a plan view of a lever rod in the locking device.

As best shown in FIG. 2, the lower rail (1) is formed substantially in a channel cross-section, with its two upper ends being oriented inwardly thereof as shown, and the upper rail (2) is slidably fitted in the lower rail (1) such as to be slidingly movable along the longitudinal direction of the lower rail (1). The upper rail (2) is formed by welding together first and second half rail members (2a)(2b), both of them having a generally identical shape with each other while their respective lower slide parts (2a-1)(2b-1) (which is formed in an outwardly projected configuration) are disposed on the opposite sides of and symmetrically relative to the center of the lower rail (2). In addition to the lower slide parts (2a-1)(2b-1), the first and second half rail members (2a)(2b) are respectively formed with vertical portions (2a-2)(2b-2) which form a connected point at which the two half rail members (2a)(2b) are welded and connected together Particularly, the second half rail member (2b) is still further formed with a horizontally extended portion (21) and a standing portion (22) in an integral manner, which are continuous from the vertical portion (2b-2).

Figure 1A:
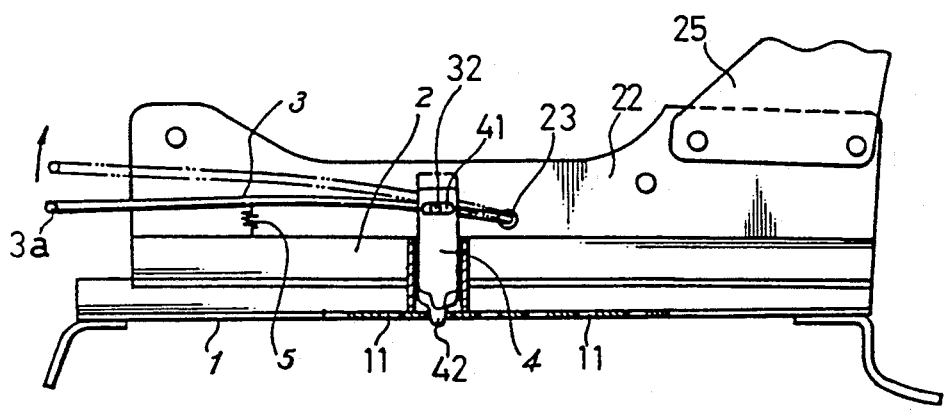
FIG. 1(A) is a partially sectional side view of a principal part of a locking device in accordance with the present invention, showing a first embodiment thereof.
Figure 1B:
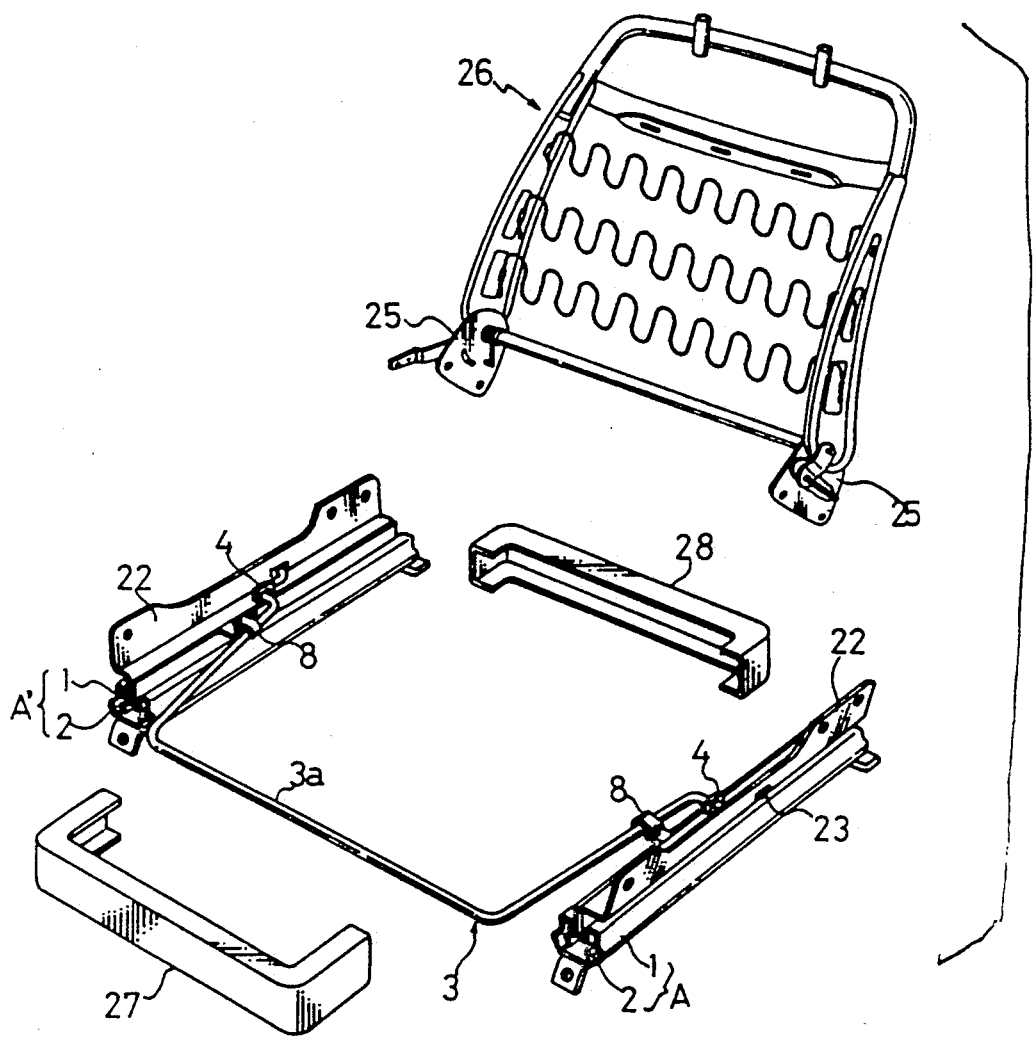
FIG. 1(B) is a perspective view of seat framework in which the same locking device as in the FIG. 1(A) is provided.

Thus, a slide rail (A) is formed in the above manner and another slide rail (A') of the same structre is given as well, thereby providing a pair of spaced-apart slide rails (A)(A'), as shown in FIG. 1(B).

In this context, FIG. 1(B) shows a forward frame member (27) and a rearward frame member (28) and as is apparent, those two frame members (27)(28) are connected by welding with the standing portions (22)(22) associated with the right and left slide rails, such that the forward frame member (27) is connected with the forward part of the standing portions (22)(22), whereas the rearward frame member (28) is connected with the rearward part of the same standing portions. It is therefore understood that this frame formation constitutes a seat cushion frame upon which is mounted a seat cushion (not shown). Further, at the rearward part of the standing portions (22)(22), is connected a seat back frame (26) via a reclining device (25). In that way, constructed is a basic framework with a pair of slide rails (A)(A') for use in a vehicle seat.

Referring now to FIG. 2, a stopper holder section (9) is formed in the vertical portion (2b-2) of the second half rail member (2b) by pressing out partway the same portion in its vertical direction, so as to define a recessed space therein in which a stopper (4) is slidably inserted. Hence, the stopper is free to be moved vertically within the stopper holder section (9). The stopper (4) is formed of a rectangular plate member, with an elongated hole (41) perforated in its upper portion and a protrudent engagement part (42) formed integrally in its lower end portion. The elongated hole (41) is defined horizontally and disposed above the top edge of the stopper holder section (9), thereby exposing itself to the exterior from the stopper holder section (9). The protrudent engagement part (42) is to be engaged into one of plural holes (11) formed in the bottom of the lower rail (1), as will be understood later. At the standing portion (22) of the second half rail member (2b), is perforated a hole (23) which is situated more rearwardly than the stopper holder section (9) with respect to the slide rail (A).

The upper end of the first half rail member (2a) is not provided with such standing portion (22), but formed with a lug (24) extending horizotally at a right angle from its vertical protion (2a-2), the lug (24) being disposed forwardly in reference to the stopper holder section (9), as shown.

To the stopper (4), is operatively connected a lever rod (3) for permitting the vertical movement of the stopper (4). As clearly shown in FIG. 3, the lever rod (3) is made of one piece of metallic rod and formed by bending it into a generally U-shaped configuration, in which a crank portion (32) is defined at its both end portions. Such crank portion (32) is inserted slidably through the elongated hole (41) of the stopper (4). The extremity edge portion (31) of the lever rod (3) is rotatably inserted into the hole (23) of the standing portion (22) and secured by a washer (6) with an E-shaped securing ring (7). The lever rod (3) is, at its lateral rod section (3a), provided with a horizontal bracket (8) at a point corresponding to the foregoing lug (24) at the slide rail (A). A tension spring (5) is connected with both horizontal bracket (8) and lug (24), and extended therebetween, so as to normally bias the lever rod (8) in a downward direction, whereby the crank portion (32) of the lever rod (8) is biased dowardly relative to the hole (23) which then acts as a rotation center of the crank portion, to thereby urge the protrudent engagement part (42) of the stopper (4) into engagement with the hole (11) of the lower rail (11). Under this state, the upper rail (2) is in a locked relation with the lower one (1). While this is described solely for the left-side slide rail (A), the same securing way of the lever rod (3) as well as the provision of the stopper (4) is applied in the right-side slide rail (A') (as can be seen in FIG. 1(B)), though not described here. Accordingly, it is to be seen, as in FIG. 1(B), that the lever rod (3) is extended between the two right and left slide rails (A)(A'), with its forward handle section (3a) projected forwardly of the two slide rails (A)(A'), thereby connecting the two stoppers (4) in an interlocking, coactive manner and giving access to the lever rod at the forward side of seat cushion.

Referring to FIG. 1(A), to unlock the slide rails (A)(A'), the forward handle section (3a) of the lever rod (3) is pushed upwardly, overcoming the downward urging force of the tension spring (24), in the arrow direction. Then, the crank portions (32)(32) of the lever rod (3) is raised with respect to the point at (23), causing upward movement of the stopper (4) to disengage its protrudent engagement part (42) from the hole (11), whereby the upper rail (2) is released from the locked relation with the lower rail (2) to allow free sliding movement of the former along the latter. An occupant on the seat may again lock the slide rails (A)(A') at a desired seating position by releasing the lever rod (3), because the lever rod (3) is lowered automatically due to the downward urging force of the spring (24), which causes downward movement of the stopper (4) and thus results in engagement of its protrudent engagement part (42) into the corresponding one of the holes (11).

Figure 4:
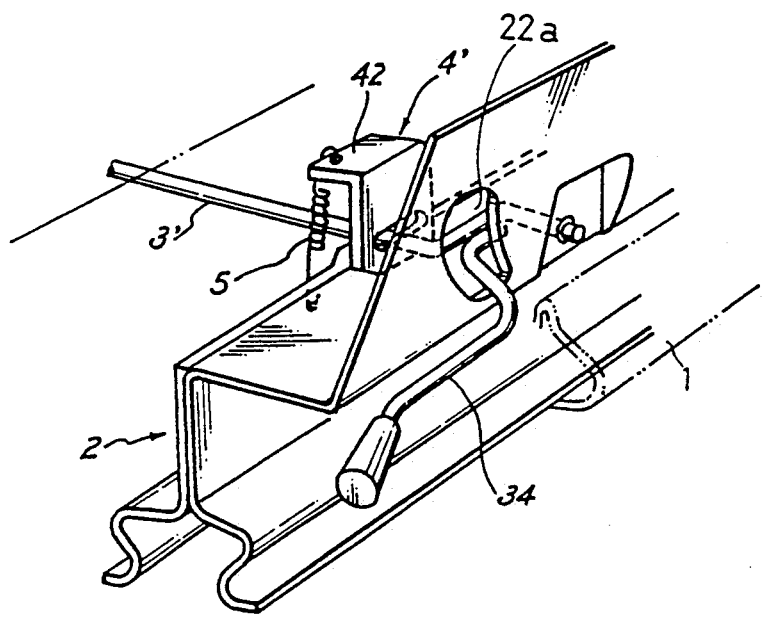
FIG. 4 is partially enlarged perspective view showing a second embodiment of a principal part of locking device in accordance with the present invention.
Figure 5:
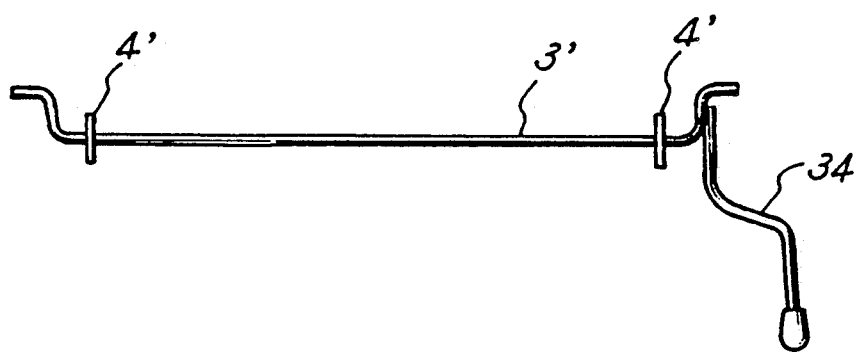
FIG. 5 is a plan view of a lever rod used in the second embodiment as in the FIG. 4.

Reference is now made to FIGS. 4 and 5, wherein a second embodiment of the present invention is shown, with different lever rod (3') and stopper (4').

In the embodiment, the slide rails used are the same with those (A)(A') in the above-described first embodiment, and all other members are identical thereto, excepting the locking mechanisms to be stated below. Thus, all like designations in this second embodiment refer to all like ones in the first embodiment.

The stopper (4') is so formed that its upper end is bent inwardly of the slide rail (A) at a right angle from the vertical body of the stopper (4') to define an horizontaly extended part (42). A tension spring (5) is extended between that horizontally extended part (42) of the stopper (4') and the upper rila (2), so as to urge the stopper (4') directly in a downward direction, in place of the bracket (8) and lug (24) associated with the first embodiment.

The lever rod (3') is formed in a generally rectilinear shape, with its both ends being slidably inserted through the elongated holes (41)(41) of the stoppers (4')(4').

An operation lever (34) is fixed to the right-side end portion of the lever rod (8'), as viewed from FIG. 5. The operation lever (34) extends outwardly out of the slide rail (A) through a longitudinally elongated hole (22a) formed in the standing portion (22) at the upper rail (2).

According to this second embodiment, the lever rod (3') and stopper (4') are more simplified in structure than those in the first embodiment, and the access to the operation lever (34) is given at the lateral side of seat cushion.

It can be seen that the access to the lever rod for actuating the stopper may be arranged at the forward or lateral side of seat cushion, as desired, depending on the design of a seat to be applied.

From the above descriptions, it is appreciated that, in accordance with the present invention, extremely simplified is this kind of dual-type locking device for right and left slide rails, using merely a lever rod and two stoppers, which leads to a great reduction of parts and assemblage involved in assembling the same. This is ideally effective in adding to further reduction of costs, especially when it is applied such low-cost-oriented slide rail having two identical half rail members as an upper rail as stated above. It is further appreciated that the two stoppers are simultaneously engaged into or from the corresponding holes of the lower rails by simply operating the lever rod and that the locking and unlocking of the two slide rails are easily, positively effected.

While having described the invention as above, it should be understood that the invention is not limited to the illustrated embodiments, but any other modifications, replacements and additions may structurally be possible without departing from the scopes and spirits of the appended claims for the invention. For example, the stopper (4 or 4') may be so formed as to have a plurality of tooth-like projections to be engaged with the holes (11) of the lower rail (1), instead of the aforementioned protrudent engagement part (42).

What is claimed is:

1. A locking device for a slide rail in a vehicle seat, in which said slide rail is two in number, forming a pair of spaced-apart slide rails in said seat, each of said slide rails including an upper rail and a lower rail, said upper rail being slidably fitted in said lower rail and being further formed by two half rail members, a pair of stoppers which are each slidably inserted in a through-bore defined between said two half rail members respectively of said two upper rails, such that said stoppers are free to be moved vertically therein;

a plurality of holes which are formed in each of said lower rails, into which holes said stoppers are to be engaged;

a rod member extending between said pair of stoppers, said rod member having an integral crank part on which is operatively connected said pair of stoppers;

means for providing an operation lever, said means being integrally defined on said rod member; and wherein a tension spring is extended between said lever rod and one of said two half rail members so as to bias said means for providing an operation lever in a direction towards said two half rail members, thereby normally urging said stoppers into engagement with said holes of said lower rails.

2. The locking device as defined in claim 1, wherein said two half rail members respectively of said two upper rails are each provided with a horizontally extended portion and a vertical portion extending upwardly from said horizontally extended portion, wherein a forward frame member and a rearward frame member are connected with said vertical portion respectively of said two half rail members, to thereby constitute a part of frame of said seat, wherein end portions of said means for providing an operation lever are rotatably connected with said two standing portion, respectively, wherein a portion of said means for providing an operation lever is abutted on the horizontal extending portion of each of said half rail members for retaining said stoppers, and wherein upper portions of said stoppers, have a horizontally elongated hole, and wherein said both end portions of said means for providing an operating lever are respectively inserted slidably through said horizontally elongated holes respectively of said stoppers.

3. The locking device as claimed in claim 2, wherein said end portions of said means for providing an operation lever are each formed with a crank portion and wherein said crank portion is slidably inserted through each of said horizontally elongated holes formed in said stoppers.

4. The locking device is defined in claim 1, wherein said means for providing an operation lever is made of a metallic rod and an operating lever comprising a generally U-shaped part which is formed by bending said rod into a U-shaped configuration.

5. The locking device as defined in claim 1, wherein said means for providing an operation lever is made of a metallic rod and an operating lever comprising an outwardly extending lever having a handle projecting from said rod member.

6. The locking device defined in claim 1, wherein said operation lever comprises an outwardly bent portion of said rod member.

7. The locking device defined in claim 1, wherein said operation lever comprises an outwardly bent portion which is located between the portions of said rod connected to said stoppers.

8. The locking device as defined in claim 1, wherein said operating lever is externally accessible.

9. The locking device as defined in claim 1, wherein said operating lever includes an outwardly bent part and an externally accessible operating part defined by said outwardly bent part.

* * * * *